(12) United States Patent
Albou (10) Patent No.: US 11,873,959 B2
(45) Date of Patent: Jan. 16, 2024

(54) OPTICAL SYSTEM

(71) Applicant: Valeo Vision, Bobigny (FR)

(72) Inventor: Pierre Albou, Bobigny (FR)

(73) Assignee: Valeo Vision, Bobigny (FR)

( * ) Notice: Subject to any disclaimer, the term of this patent is extended or adjusted under 35 U.S.C. 154(b) by 20 days.

(21) Appl. No.: 17/765,300

(22) PCT Filed: Oct. 14, 2020

(86) PCT No.: PCT/EP2020/078972
§ 371 (c)(1),
(2) Date: Oct. 31, 2022

(87) PCT Pub. No.: WO2021/074257
PCT Pub. Date: Apr. 22, 2021

(65) Prior Publication Data
US 2023/0068695 A1    Mar. 2, 2023

(30) Foreign Application Priority Data

Oct. 15, 2019 (FR) ...................................... 1911473

(51) Int. Cl.
*F21S 41/275*     (2018.01)
*F21S 41/143*     (2018.01)
(Continued)

(52) U.S. Cl.
CPC ........... *F21S 41/275* (2018.01); *F21S 41/143* (2018.01); *F21S 41/153* (2018.01); *F21V 5/004* (2013.01);
(Continued)

(58) Field of Classification Search
CPC ...... F21S 41/275; F21S 41/143; F21S 41/153; F21Y 2115/10; G02B 5/0215;
(Continued)

(56) References Cited

U.S. PATENT DOCUMENTS

| 10,076,994 B2 | 9/2018 | Kinoshita et al. |
| 2007/0176195 A1 | 8/2007 | Kuiseko et al. |

(Continued)

FOREIGN PATENT DOCUMENTS

| DE | 102008023551 A1 * | 11/2009 | ............ F21S 41/255 |
| DE | 102008039092 A1 | 2/2010 | |

(Continued)

OTHER PUBLICATIONS

European Patent Office, International Search Report (with English translation) and Written Opinion of corresponding International Application No. PCT/EP2020/078872, dated Dec. 14, 2020.
(Continued)

*Primary Examiner* — Erin Kryukova
(74) *Attorney, Agent, or Firm* — Valeo Vision (57) ABSTRACT

An optical device for a lighting module. The invention relates to an optical device and a lighting module including a light source provided with a plurality of emitting elements and with said optical device. One face of a lens of the device comprises an array of recessed patterns, each of which is
(Continued)

organized with a specific profile so as to produce an optimized light distribution. The profile in particular has a rotational symmetry.

11 Claims, 4 Drawing Sheets

(51) Int. Cl.
| | |
|---|---|
| *F21S 41/153* | (2018.01) |
| *F21V 5/00* | (2018.01) |
| *F21Y 115/10* | (2016.01) |
| *F21W 103/35* | (2018.01) |
| *F21W 102/13* | (2018.01) |

(52) U.S. Cl.
CPC ..... *F21W 2102/13* (2018.01); *F21W 2103/35* (2018.01); *F21Y 2115/10* (2016.08)

(58) Field of Classification Search
CPC .......... F21V 5/002; F21V 5/004; F21V 5/005; F21V 5/007; F21W 2103/35; F21W 2102/13

See application file for complete search history.

(56) References Cited

U.S. PATENT DOCUMENTS

| | | | | |
|---|---|---|---|---|
| 2009/0135491 | A1* | 5/2009 | Endoh | ................... G02B 5/045 |
| | | | | 359/601 |
| 2016/0369978 | A1* | 12/2016 | Sun | ....................... F21V 17/002 |
| 2017/0254496 | A1 | 9/2017 | Pellarin et al. | |

FOREIGN PATENT DOCUMENTS

| | | | |
|---|---|---|---|
| DE | 102015219211 A1 | 4/2017 | |
| EP | 2620695 A2 * | 7/2013 | ............ F21S 41/143 |
| JP | 2006-227471 A | 8/2006 | |
| JP | 2017-138523 A | 8/2017 | |
| JP | 2017-195050 A | 10/2017 | |
| WO | 2013104785 A1 | 7/2013 | |
| WO | WO-2015031924 A1 * | 3/2015 | ............ F21S 41/275 |

OTHER PUBLICATIONS

Japan Patent Office, Office Action (with English translation) of corresponding Japanese Patent Application No. 2022-522729, dated Sep. 1, 2023.

* cited by examiner

Detail A

OPTICAL SYSTEM

CROSS-REFERENCE TO RELATED APPLICATIONS

This application is filed under 35 U.S.C. § 371 U.S. National Phase of International Application No. PCT/EP2020/078972 filed Oct. 14, 2020 (published as WO2021074257), which claims priority benefit to French application No. 1911473 filed on Oct. 15, 2019, the disclosures of which are herein incorporated by reference in their entirety.

TECHNICAL FIELD

The present invention relates to lighting and/or signaling devices and the optical components involved therein. It is particularly advantageously applicable to the field of motor vehicles.

BACKGROUND OF THE INVENTION

In the automotive sector, devices capable of emitting light beams, also called lighting and/or signaling functions, generally complying with regulations, are known.

Technologies that make it possible to produce a segmented beam, also called a pixelated beam, for implementing advanced lighting functions, have recently been developed. This is especially the case for an "additional driving" lighting function, which is generally based on a plurality of illuminating units each comprising one light-emitting diode, which diodes may be driven individually. This beam may in particular be used to supplement the lighting provided by a dipped beam, so as to form driving lighting.

The beam, which results from the various beam segments generated by each of the diodes, is projected by way of a projecting optical system generally comprising one or more lenses. For example, it is possible to produce an additional driving beam, combined with a basic beam that is fully or at least mostly projected below a horizontal cut-off line of the type used for the dipped headlight function, the additional driving beam being added to the basic beam so as to supplement it above the cut-off line; advantageously, this additional driving beam is adaptive so as to switch on or switch off certain parts of the overall projected beam, for example for anti-dazzle functions. The acronym ADB (for Adaptive Driving Beam) is used for this type of function.

In the present description, segmented beam is the name given to a beam whose projection forms an image composed of beam segments, each segment being able to be switched on independently. A pixelated light source may be used to form these segments. Such a source comprises a plurality of selectively activatable emissive elements.

The emissive elements are placed next to one another on a support, with a certain pitch. The spacing between these elements means that segments projected by contiguous emissive elements do not form a perfect continuity. This spacing results in a transition contrast, with darker parts in the areas joining the segments. This phenomenon degrades the quality of the overall beam and a contrast level below a threshold (typically less than 5% for a contrast calculated using Michelson's formula) needs to be achieved in order to comply with the specifications for such lighting functions.

At the same time, if it is sought to blur the contour of the segments in order to fade these transitions, this leads to a contour of the overall beam formed by the joining of the segments that is not as sharp. In an ADB function, this sharpness is however desired in order to effectively delimit areas in which other drivers are not dazzled, without switching off more emissive elements than necessary.

One aim of the present invention is therefore to propose an optical system for processing light rays coming from the pixelated source that provides satisfactory sharpness of the contour of a segmented beam and suitable homogeneity of the illumination within the beam.

Other aims, features and advantages of the present invention will become apparent on examining the following description and the accompanying drawings. It will be understood that other advantages may be incorporated.

BRIEF SUMMARY OF THE INVENTION

To achieve this aim, according to one embodiment, provision is made for an optical device for projecting light beams, able to interact with a pixelated light source comprising a plurality of selectively activatable emissive elements, the device comprising a lens a first face of which comprises an array of recessed patterns, characterized in that each pattern is such that:
 it exhibits rotational symmetry about a local normal direction z to the first face so as to define, in any plane containing the local normal direction z, a symmetrical profile with two areas, specifically a first area and a second area, about the local normal;
 each of the two areas comprises two portions, a basal portion of the first area having a bottom joining point with the basal portion of the second area, the basal portion of the first area comprising a first intermediate joining point with a top portion of the first area, and the basal portion of the second area comprising a second intermediate joining point with a top portion of the second area;
 for each of the two areas, the basal portion and the top portion are symmetrical about their respective intermediate joining point.

By virtue of this profile of recessed patterns, the sharpness of the edge of the beam is better controlled and the spreading of the beam is regulated, advantageously without its angle being too high. For example, the spreading angle may be made less than or equal to 0.02°.

It is thus possible to implement a bidirectional transmittance function within the lens, with optimized parameters.

Another aspect relates to a lighting module, in particular for a motor vehicle, comprising an optical device, and a pixelated light source comprising a plurality of selectively activatable emissive elements. In particular, when the lighting module comprises a pixelated light source comprising selectively activatable emissive elements, the symmetry of the pattern about the intermediate joining point of the pattern makes it possible to ensure controlled spreading, such that joining areas between emissive elements do not create dark parts in the image by the lens of the pixelated light source. In addition, color inhomogeneities in the beam corresponding to inhomogeneities in one of the emissive elements are attenuated or completely concealed.

Another aspect relates to a vehicle equipped with at least one module according to the present invention.

BRIEF DESCRIPTION OF THE DRAWINGS

The aims, objects, features and advantages of the invention will become more clearly apparent from the detailed description of one embodiment of the latter, which embodiment is illustrated by the following accompanying drawings, in which.

The drawings are given by way of example and do not limit the invention. They are schematic conceptual depictions intended to facilitate understanding of the invention and are not necessarily drawn to the scale of practical applications.

DETAILED DESCRIPTION OF THE INVENTION

Unless specifically indicated otherwise, technical features that are described in detail for one given embodiment may be combined with technical features that are described in the context of other embodiments that are described by way of non-limiting example.

An introduction is given here to options that may be implemented, either separately or in any feasible combination:

the symmetrical profile may exhibit, at the bottom joining point 233, a tangent orthogonal to the local normal direction;
this profile may also lead to an infinite second drift at the bottom point 233;
the symmetrical profile is possibly defined by the following formula of the basal portion 231 of the first area:

$$F(y) = \frac{2}{3(n-1)} \sqrt{\frac{k}{\pi}} y^{\frac{3}{2}}$$

where:
i. F(y) is a coordinate of a point of the basal portion 231 of the first area, along the local normal direction z using the bottom joining point with the basal portion of the second area as the origin of the coordinates along the local normal direction z, said point having y as coordinate along a local direction perpendicular to the local normal direction z;
ii. n is the refractive index of the material of the lens;
iii. k is a constant.

The first face is possibly the exit face 22 of the lens 2;
the first face is optionally carried by a plane;
the first face is alternatively carried by a portion of a sphere;
the maximum deflection angle $\delta_{max}$ of light rays at output is advantageously less than or equal to the width, and preferably to a half-width, of an emissive element of the plurality of emissive elements 11;
the patterns 23 may have a depth dimension less than 2 µm;
the patterns 23 may have a diameter less than 1.5 mm at the first face;
the lens 2 may be a projection lens.

In the features described below, terms relating to verticality, horizontality and transversality (or even the lateral direction), or equivalents thereof, are to be understood with respect to the position in which the lighting module is intended to be fitted in a vehicle. The terms "vertical" and "horizontal" are used in the present description to designate, regarding the term "vertical", a direction with an orientation perpendicular to the plane of the horizon (which corresponds to the height of the modules), and, regarding the term "horizontal", a direction with an orientation parallel to the plane of the horizon. They are to be considered under the conditions of operation of the device in a vehicle. The use of these words does not mean that slight variations about the vertical and horizontal directions are excluded from the invention. For example, an inclination relative to these directions of the order of + or −10° is here considered to be a minor variation about the two preferred directions. With respect to the horizontal plane, the inclination is in principle between −5° and 4°, and it is between −6° and 7.5° laterally.

Motor-vehicle headlamps are equipped with one or more lighting modules arranged in a casing closed by an outer lens so as to obtain one or more lighting and/or signaling beams at output from the headlamp. Simplistically, a lighting module of the casing comprises, in particular, a light source that emits a light beam, an optical system comprising one or more lenses and, in some cases, an optical element, for example a reflector, for orienting the light rays generated by the light sources, in order to form the light beam output from the optical module. The situation is identical for the rear lights.

The invention may contribute to a driving beam function whose purpose is to illuminate the scene in front of the vehicle over a wide area, but also over a substantial distance, typically around two hundred meters. This light beam, due to its lighting function, is mainly located above the horizon line. It may for example have a slightly upward sloping lighting optical axis. In particular, it may be used to generate an "additional driving" lighting function that forms a portion of a driving beam additional to that produced by a near-field beam, the additional driving beam seeking entirely, or at least mostly, to illuminate above the horizon line, whereas the near-field beam (which may have the specific features of a low beam) seeks to illuminate entirely, or at least mostly, below the horizon line.

The device may also be used to form other lighting functions via or apart from those described above in relation to adaptive beams.

Figure 1:
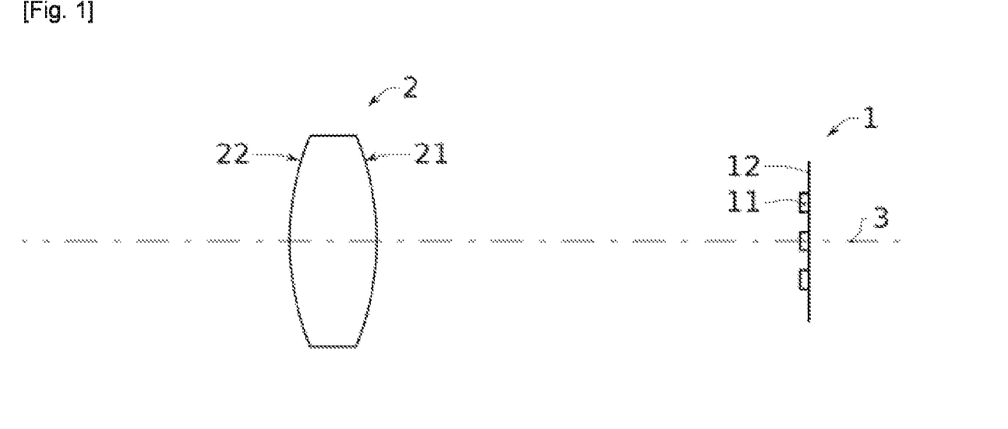
FIG. 1 shows a schematic view of a lighting module.

The module of the invention incorporates at least one light source 1 for generating a segmented beam to be projected via the optical system. FIG. 1 schematically shows this situation, the optical device here having only one lens; it is understood that the device may comprise more components, for example a slide bearing the recessed patterns and/or other lenses, and in particular at least one projection lens.

The source 1 comprises a support 12, one face of which carries selectively activatable emissive elements 11, for example based on LED technologies, as described below.

A lens 2 forms, or contributes to forming, the optical system. Placed downstream of the source 1, it receives light via an entry face 21 and outputs it via the exit face 22. It will be seen later that the lens 2 comprises an array of recessed patterns starting from one of its faces. For the rest, this lens may be optically neutral; for example, it may be produced on the basis of a slide whose faces are planar and parallel.

According to another option, at least one of the faces of the lens exhibits a curvature. Spherical lenses may in particular be implemented.

The invention may be implemented with various optical materials for the lens 2. In particular, this may be a polymer material such as PMMA (for polymethyl methacrylate) or polycarbonate, or glass.

As shown schematically in FIG. 1, the optical axis of the module comprising the light source 1 and the optical device, represented here by the lens 2, bears the reference numeral 3. The optical axis 3 may be oriented substantially horizontally.

The light source 1 may in particular be designed in the form of a matrix array of emissive elements whose activation may be driven individually, so as to switch off or switch on any one of the emissive elements. The shape of the resulting beam is thus varied with very great flexibility. Purely by way of illustration, it is possible to implement a matrix array of emissive elements, for example forming 4000 pixels or even more, arranged in rows and columns, for example 44 rows and 28 columns.

As known per se, the present invention may use light-emitting diodes (also commonly called LEDs) as light sources. These may potentially be one or more organic LEDs. These LEDs may in particular be provided with at least one chip using semiconductor technology and able to emit light. Moreover, the expression light source is here understood to mean a set of at least one elementary source such as an LED able to produce a flux leading to the generation of at least one light beam at the output of the module of the invention. In one advantageous embodiment, the exit face of the source is of rectangular cross section, this being typical for LED chips.

The light-emitting source preferably comprises at least one monolithic matrix array of light-emitting elements, also called a monolithic matrix array. In a monolithic matrix array, the light-emitting elements are grown from a common substrate, or have been transferred thereto, and are electrically connected so as to be able to be activated selectively, individually or by subset of light-emitting elements. The substrate may be made mainly of semiconductor material. The substrate may comprise one or more other materials, which are for example non-semiconductors. Each light-emitting element or group of light-emitting elements may thus form a luminous pixel and is able to emit light when its or their material is supplied with electricity. The configuration of such a monolithic matrix array makes it possible to arrange selectively activatable pixels very close to one another, in comparison with conventional light-emitting diodes that are intended to be soldered onto printed circuit boards. The monolithic matrix array within the sense of the invention comprises light-emitting elements a main dimension of elongation of which, specifically the height, is substantially perpendicular to a common substrate, this height being at most equal to one micrometer.

Advantageously, the one or more monolithic matrix arrays able to emit light rays may be coupled to a control unit for controlling the light emission of the pixelated source. The control unit may thus control (this may also be called drive) the generation and/or the projection of a pixelated light beam by the lighting device. The control unit may be integrated into the lighting device. The control unit may be mounted on one or more of the matrix arrays, the assembly thus forming a lighting module. The control unit may comprise a central processing unit coupled to a memory storing a computer program that comprises instructions allowing the processor to perform steps that generate signals for controlling the light source. The control unit may thus for example individually control the light emission of each pixel of a matrix array. Furthermore, the luminance obtained by the plurality of light-emitting elements is at least 60 $Cd/mm^2$, preferably at least 80 $Cd/mm^2$.

The control unit may form an electronic device able to control the light-emitting elements. The control unit may be an integrated circuit. An integrated circuit, also called an electronic chip, is an electronic component that reproduces one or more electronic functions and is able to integrate several types of basic electronic component, for example in a limited volume (i.e. on a chip). This makes the circuit easy to implement. The integrated circuit may be for example an ASIC or an ASSP. An ASIC (acronym for "Application-Specific Integrated Circuit") is an integrated circuit developed for at least one specific application (that is to say for a client). An ASIC is therefore a specialized (microelectronic) integrated circuit. Generally speaking, it groups together a large number of unique or tailored functions. An ASSP (acronym for "Application-Specific Standard Product") is an integrated (microelectronic) electronic circuit that groups together a large number of functions in order to satisfy a generally standardized application. An ASIC is designed for a more particular (specific) need than an ASSP. The monolithic matrix arrays are supplied with electricity via the electronic device, which is itself supplied with electricity using for example at least one connector connecting it to an electricity source. The electricity source may be internal or external to the device according to the invention. The electronic device supplies electricity to the light source. The electronic device is thus able to control the light source.

According to the invention, the light source preferably comprises at least one monolithic matrix array whose light-emitting elements extend projecting from a common substrate. This arrangement of elements may result from growth on the substrate from which they were respectively grown, or from any other production method, for example by transferring the elements using transfer techniques. Various arrangements of light-emitting elements may meet this definition of a monolithic matrix array, provided that the light-emitting elements have one of their main dimensions of elongation substantially perpendicular to a common substrate and that the spacing between the pixels, formed by one or more light-emitting elements grouped together electrically, is small in comparison with the spacings that are imposed in known arrangements of flat square chips soldered to a printed circuit board.

In particular, the light source according to one aspect of the invention may comprise a plurality of light-emitting elements distinct from the others and that are grown individually from the substrate, while being electrically connected so as to be selectively activatable, where applicable by subsets within which rods may be activated simultaneously.

According to one embodiment that is not shown, the monolithic matrix array comprises a plurality of light-emitting elements, of submillimeter dimensions, or even dimensions of less than 10 μm, which are arranged projecting from a substrate so as to form rods with a hexagonal cross section. The light-emitting rods extend parallel to the optical axis of the lighting module when the light source is in position in the casing.

These light-emitting rods are grouped together, in particular by electrical connections specific to each set, into a plurality of selectively activatable portions. The light-emitting rods originate on a first face of a substrate. Each light-emitting rod, here formed using gallium nitride (GaN), extends perpendicular, or substantially perpendicular, to, and thereby protrudes from, the substrate, which here is made of silicon, though other materials, such as silicon carbide, may be used without departing from the context of the invention. By way of example, the light-emitting rods could be made of an alloy of aluminum nitride and of gallium nitride (AlGaN), or of an alloy of aluminum, indium and gallium phosphides (AlInGaP). Each light-emitting rod extends along an axis of elongation defining its height, the base of each rod being arranged in a plane of the upper face of the substrate.

According to another embodiment that is not shown, the monolithic matrix array may comprise light-emitting elements formed by layers of epitaxial light-emitting elements, in particular a first layer of n-doped GaN and a second layer of p-doped GaN, on a single substrate, for example made of silicon carbide, and which is sliced (by grinding and/or ablation) to form a plurality of pixels respectively originating from one and the same substrate. The result of such a design is a plurality of light-emitting blocks all originating from one and the same substrate and electrically connected so as to be selectively activatable from one another.

In one exemplary embodiment according to this other embodiment, the substrate of the monolithic matrix array may have a thickness of between 100 µm and 800 µm, in particular equal to 200 µm; each block may have a length and a width, each being between 50 µm and 500 µm, preferably between 100 µm and 200 µm. In one variant, the length and the width are equal. The height of each block is less than 500 µm, preferably less than 300 µm. Finally, the exit surface of each block may be formed via the substrate on the side opposite the epitaxy. The distance separating the contiguous pixels may be less than 1 µm, in particular less than 500 µm, and it is preferably less than 200 µm.

With regard to the light-emitting block monolithic chips:
The number of pixels may be between 250 and several thousand. A typical value is around a thousand pixels.
Their overall shape is usually square, and may also be rectangular. Aspect ratio is generally between 1:1 and 1:5.
The size of a unit pixel (square in all known cases, may be rectangular) is between 100 and 300 µm in the current state of the art.

According to another embodiment that is not shown, both with light-emitting rods extending respectively projecting from one and the same substrate, as described above, and with light-emitting blocks obtained by slicing light-emitting layers superimposed on one and the same substrate, the monolithic matrix array may furthermore comprise a layer of a polymer material in which the light-emitting elements are at least partially embedded. The layer may thus extend over the entire extent of the substrate, or only around a given group of light-emitting elements. The polymer material, which may in particular be silicone-based, creates a protective layer that allows the light-emitting elements to be protected without hindering the diffusion of the light rays. Furthermore, it is possible to integrate, into this layer of polymer material, wavelength conversion means, for example luminophores, that are able to absorb at least some of the rays emitted by one of the elements and to convert at least some of said absorbed excitation light into an emission light having a wavelength that is different from that of the excitation light. Provision may be made without distinction for the luminophores to be embedded in the mass of the polymer material, or else to be arranged on the surface of the layer of this polymer material. It is also possible to vacuum-deposit the phosphors on the semiconductor chips, without the polymer layer. The light source may furthermore comprise a coating of reflective material to deflect the light rays toward the exit surfaces of the pixelated source.

The light-emitting elements of submillimeter dimensions define a given exit surface in a plane substantially parallel to the substrate. It will be understood that the shape of this exit surface is defined depending on the number and the arrangement of the light-emitting elements that form it. It is thus possible to define a substantially rectangular shape of the emission surface, it being understood that the latter may vary and adopt any shape without departing from the context of the invention.

Figure 2:
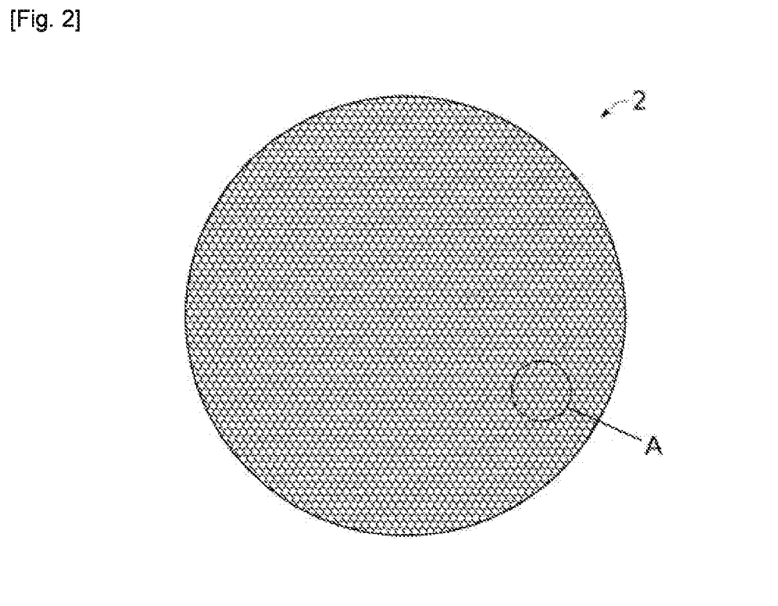
FIG. 2 shows a microstructured lens face.
Figure 3:
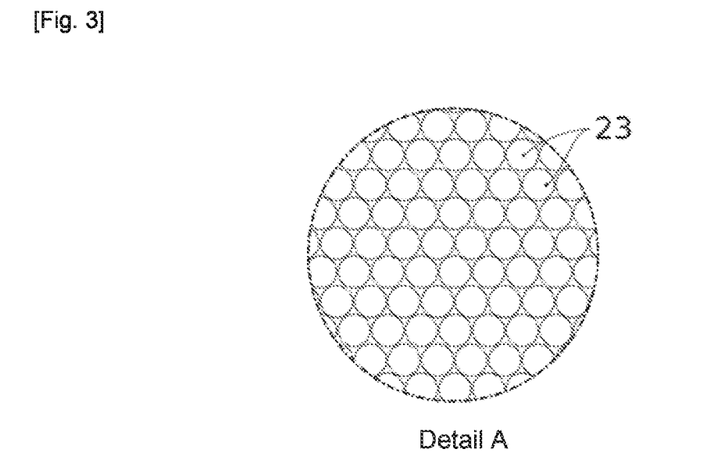
FIG. 3 shows a detail of FIG. 2.

In order to adjust the transmittance function of the optical device of the invention, the lens 2 has, advantageously on a first face, here the face 22 forming its exit face, an array of recessed patterns 23. An indicative depiction of the face 22 is given in FIG. 2 and a detail, revealing the external contour of the recessed patterns 23 in more detail, is provided in FIG. 3. Advantageously, the recessed patterns 23 have an identical profile. It is understood that each recessed pattern 23 opens out onto the first face, here the exit face 22, so as to form an aperture with a circular cross section, that is to say with a circular projection onto a plane perpendicular to the normal to the first surface in the center of the pattern. Advantageously, the patterns 23 are as close as possible to one another so as to occupy a maximum portion of the surface of the first face.

If the first face is planar and perpendicular to the optical axis 3, the profile of the recessed patterns 23 is advantageously organized such that the depth dimension of each pattern 23 is parallel to the optical axis 3, that is to say normal to the first face.

If the first face is curved, the depth dimension of each pattern 23 is angularly offset relative to the optical axis 3, so as to correspond to a local normal direction to the surface of the first face. For example, if the first face is spherical, the local normal direction corresponds to a radius of the spherical shape, at the location of the axis of symmetry (explained later) of the recessed pattern 23 that is located there.

Figure 4:
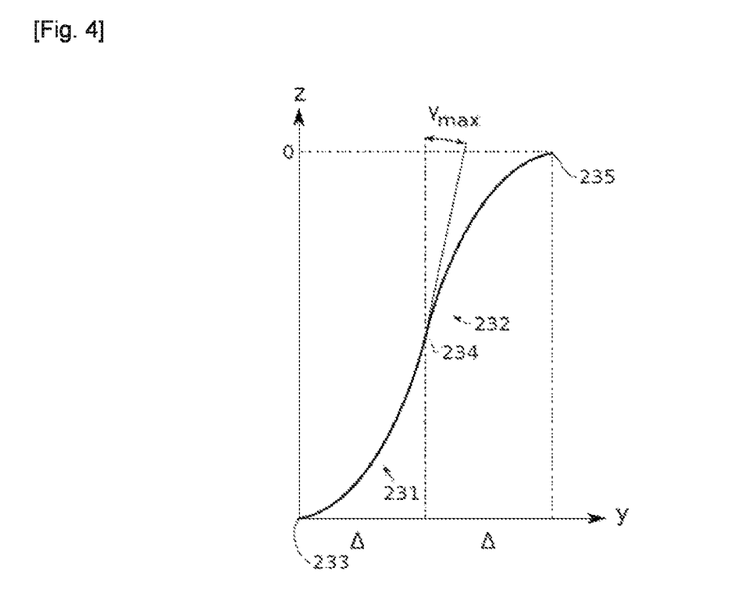
FIG. 4 is a depiction of a half-profile of a microstructure formed by a recessed pattern in the lens.

Thus, for a given recessed pattern 23, the profile of its surface may be defined in any plane containing the local normal direction, hereinafter called "z" or else F(y). FIG. 4 gives an illustration of this. The profile of the recessed pattern 23 is shown in thick lines; this is a depiction of one half of the profile, the other half being symmetrical to the one shown in the figure, relative to the direction z. The direction "y" corresponds to the local tangent to the first face, that is to say a direction perpendicular to the local normal direction z. In this figure, the value Δ corresponds to one quarter of the maximum width of the recessed pattern, taken in the direction y.

As mentioned above, the half-profile given, in a plane yz, in FIG. 4 is enough to define the whole of the shape of the recessed pattern. Specifically, the latter exhibits symmetry about the axis z. It is also identical in any plane yz, that is to say that the orientation of the direction y has no influence on the shape. The half-profile thus corresponds to a first area, a second area of which is symmetrical about the direction z.

FIG. 4 also provides a division of the half-profile, corresponding to a first area of the overall symmetry profile of the recessed portion 23, into two portions 231, 232. The portion 231 is a basal portion that extends from the bottom point 233 of the pattern to the intermediate point 234, advantageously located in the middle of the height and the width of the pattern. The portion 231 has a concave conformation.

The portion 232 is a top portion in the sense that it opens out onto the aperture of the recessed pattern on the first face. It extends between the intermediate point 234 and the top of the pattern, the point 235.

Advantageously, the basal portion 231 and the top portion 232 are symmetrical to one another, about the point 234. Under these conditions, the curvature of the top portion is convex.

It is understood that the basal portion 231 extends over a width A from the point 233, and that the top portion 232 extends over the same width A from the point 234.

Symmetrically, the second half-profile comprises a basal portion that is symmetrical about z of the basal portion 231. The two basal portions meet at the point 233. At this level, advantageously, the tangent to the curve resulting therefrom is orthogonal to the local normal direction.

Moreover, still at this level, the second derivative is infinite.

Dividing the complete profile into four portions allows precise spreading of the resulting beam, so as to produce a cut-off with a sharp edge. Moreover, the geometric arrangements resulting from the invention, in particular in terms of tangent and second derivative at the bottom joining point 233, act in favor of the gradation of optical power, so as to obtain a resulting illumination that is as constant as possible through transmission in the pattern 23. In particular, the shape of the recessed patterns may be configured so as to produce, at output, illumination in the form of a plateau, with a constant light intensity at the top of the plateau and straight plateau edges, and in particular in the case of an emerging plane wave (after passing through the first surface in the absence of any pattern), provided that this wave has a constant intensity (independent of the measuring point).

One specific exemplary embodiment of the profile of a recessed pattern 23 is provided below, under the assumption that the first face equipped with these microstructures is planar and normal to the optical axis 3.

In the basal portion 231, the curve reflecting the surface of the pattern 23 is expressed by the function: z=F(y). It is understood that, at any point having the coordinates y, z, there is a corresponding point of the basal portion 231 if z=F(y). The determination of this function is given below. F(y)=z=0 will be chosen at the joining point between the first and second areas, at the bottom of the pattern.

Based on incident light rays directed parallel to the local normal direction (corresponding to z), one parameter is the angular deflection of the rays, expressing a spreading value. In FIG. 4, the parameter $\gamma_{max}$, between the direction of the most deflected rays and the local normal direction z, has been given.

Figure 5:
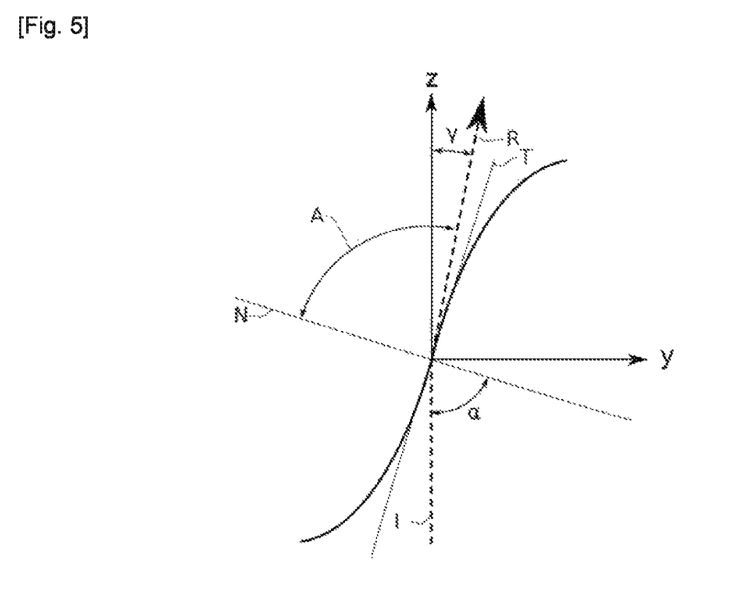
FIG. 5 gives construction angles of the profile.

FIG. 5 shows the geometric parameters, at a point of the portion 231, on the basis of an incident ray I producing an exiting ray R deflected by a deflection angle $\gamma$ relative to the local normal direction z; at the point under consideration, the tangent to the profile is T and the normal N.

Under these conditions, and using n to denote the refractive index of the material of the lens 2, it is possible to write the following formula 1:

$$\gamma = \arcsin(n \sin(\alpha)) - \alpha \quad \text{[Math 1]}$$

by taking $\alpha$ to correspond to the angle between the direction of the incident rays (typically parallel to z) and the normal N to the profile at the point under consideration, or else $\alpha$ such that:

$$\tan(\alpha) = \frac{dF}{dy} \quad \text{[Math 2]}$$

The angle arcsin(n sin $\alpha$) is given under the symbol A in FIG. 5.

Figure 6:
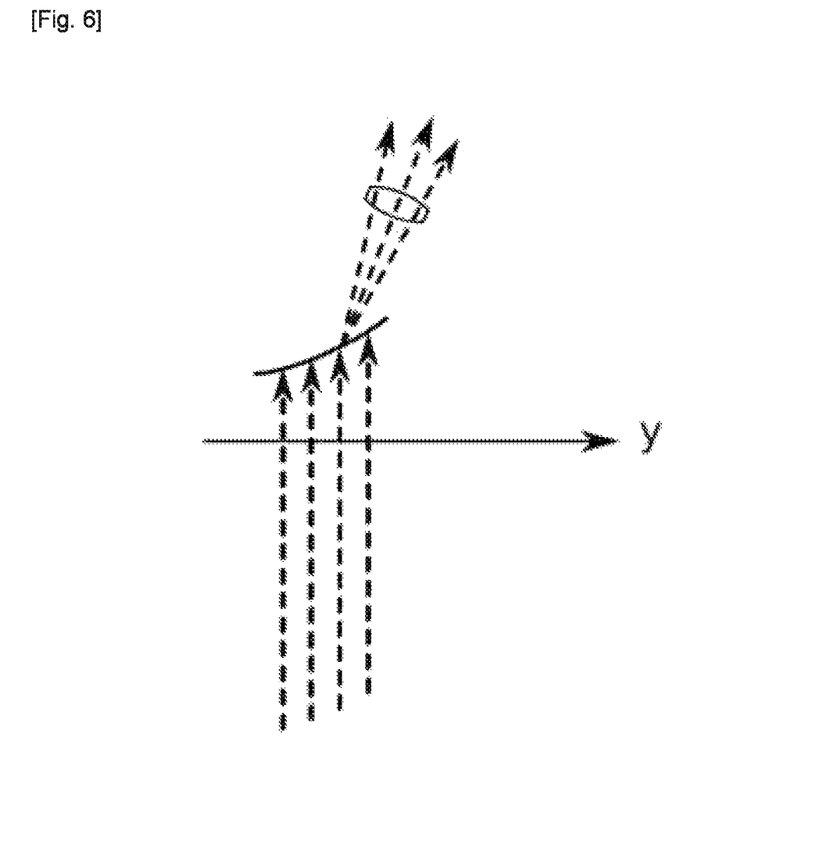
FIG. 6 explains the concept of a solid angle at a point of the surface of the recessed pattern.

FIG. 6 reveals the ability to spread light through the profile of the recessed pattern. In particular, it is possible to define a solid angle $d\Omega$ corresponding to the maximum three-dimensional spreading of the deflected rays, on the basis of incident rays directed along z. In order to have regular lateral spreading of the exiting rays, and therefore constant illumination, a parameter k is set, which is a constant reflecting this spreading and which corresponds to $d\Omega/dy$.

Still in the case of a lens 2 whose face is planar, it is also possible to write:

$$2\pi \sin(\gamma) \cdot d\gamma = k \cdot d\gamma \quad \text{[Math 3]}$$

The above equation expresses that $d\Omega/dy = k$ by writing $d\Omega = \sin(\gamma) d\gamma d\phi$, integrated between 0 and $2\pi$ over $\phi$, angle of rotation about the local axis parallel to z (angle not otherwise involved in the calculations); hence it is possible to write the following formula, knowing that $d\cos(x)/dx = -\sin(x)$ $$\cos(\gamma) = 1 - \frac{k \cdot y}{2\pi} \quad \text{[Math 4]}$$

Figure 7:
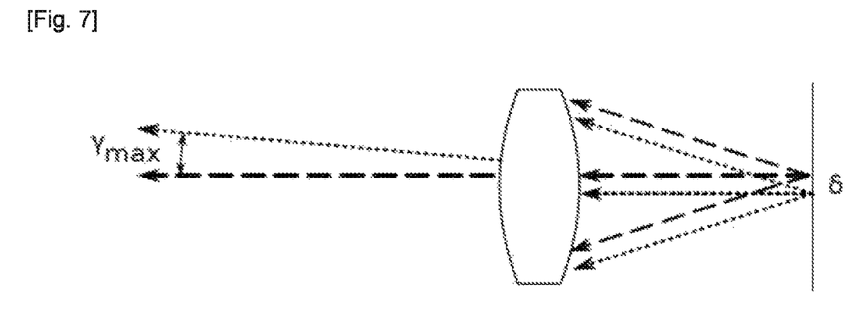
FIG. 7 gives an explanation of calculating a deflection.

There is also:

$$\cos(\gamma_{max}) = 1 - \frac{k \cdot \Delta}{2\pi} \quad \text{[Math 5]}$$

with $$\gamma_{max} = \arctan\left(\frac{\delta}{f}\right) \quad \text{[Math 6]}$$

where $\delta$ corresponds to the extent of the blur in the object space and f corresponds to the focal length of the projection optical system. FIG. 7 explains this parameter $\delta$ in that it matches a lateral offset at the source, $\delta$, with a deflection offset at the output of the optical system, $\gamma_{max}$. For example, $\delta$ may correspond to a dimension less than the width of a pixel, or even the width of a half-pixel. This may correspond to less than 100 µm, for example 60 µm. This then gives:

$$k = \frac{2\pi}{\Delta}\left(1 - \cos\left(\arctan\left(\frac{\delta}{f}\right)\right)\right) \quad \text{[Math 7]}$$

Solution to Obtain the Function F

These basic formulas may be solved in order to determine the function F.

From formula 1 above, the function sin(α(y)) is the solution to a bisquare equation as a function of γ. Moreover, in general, it is also possible to write:

$$\tan(v) = \frac{\sin(v)}{\sqrt{1-\sin(v)^2}}$$ [Math 8]

meaning that it is possible to analytically establish:

$$g(y)=\tan(\alpha(y))$$ [Math 9]

which may be integrated relative to y in order to deduce the function F insofar as, according to the formula math 2 above:

$$\frac{dF}{dy} = g(y)$$ [Math 10]

Application to Small Deflections

Advantageously, what is sought is a small maximum deflection of the exiting rays (small parameter $\gamma_{max}$), close to zero. A deflection of 0.02° is typically sought. Under these conditions, the values α and γ are also close to zero. It is therefore possible to simplify the above expressions so as to write:

$$\cos(\gamma) = 1 - \frac{\gamma^2}{2} + o(\gamma^2)$$ [Math 11]

hence:

$$\gamma = \sqrt{\frac{k.y}{\pi}}$$ [Math 12]

There is also:

$$\sin(v)=v+o(v^2)$$ [Math 13]

Where v is a generic variable, also often denoted x for a dimension and where o(x) means "negligible compared to x" (final term of a limited expansion).

$$\arcsin(v)=v+o(v^2)$$ [Math 14]

$$\tan(v)=v+o(v^2)$$ [Math 15]

hence:

$$\arcsin(n\sin(\alpha)) - \alpha = (n-1)\alpha + o(\alpha^2)$$ [Math 16]

$$\alpha = \frac{1}{n-1}\cdot\sqrt{\frac{k.y}{\pi}} = \frac{dF}{dy}$$ [Math 17]

and finally:

$$F(y) = \frac{2}{3(n-1)}\sqrt{\frac{k}{\pi}}\,y^{\frac{3}{2}}$$ [Math 18]

The function F thus defined depends only on the parameter k reflecting the desired spreading of the exiting rays, for a given refractive index. Advantageously, the power assigned to y in the formula F(y) is less than two.

In this configuration of the profile, the tangent becomes perpendicular to the local normal direction z at the bottom joining point 233, with an infinite second derivative.

The other portions of the profile are deduced from the portion 231 owing to the symmetries. In particular, the following deduced functions f(y) are present:

f(y)=F(y)−2F(Δ) if y is less than or equal to Δ, and f(y)=−F(2Δ−y) if y is greater than Δ and less than or equal to 2Δ, with the origin of the coordinates along z, which y is modified with respect to the preceding calculation of F(y) since it is taken here not at the bottom of the pattern as before, but at the top of said pattern. Another expression may be adopted, while keeping the origin along z at the bottom of the pattern:

f(y)=F(y) if y is less than or equal to Δ, and f(y)=2F(Δ)−F(2Δ−y) if y is greater than Δ and less than or equal to 2Δ.

Figure 8:
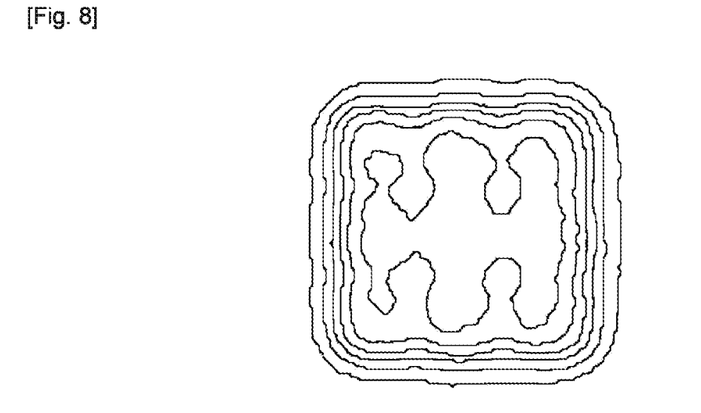
FIGS. 8 and 9 show the result of a beam projection, with a different configuration of the lens by varying the deflection at the source output ($\delta$).
Figure 9:
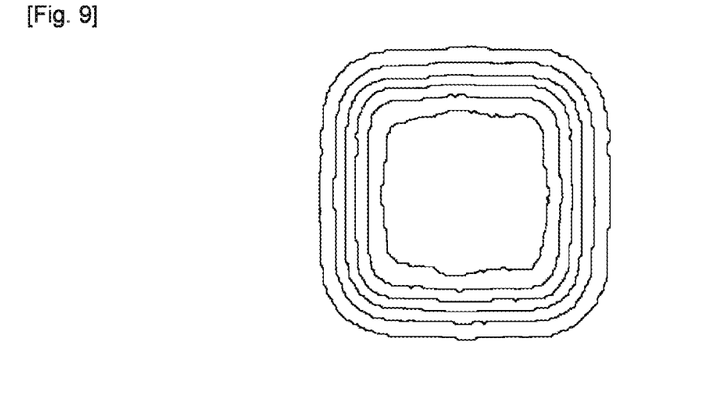

FIGS. 8 and 9 provide two examples of the result produced by the invention with different settings for the parameter $\gamma_{max}$. In the first case, the spaces between the emissive elements are relatively detectable, such that illumination homogeneity is not perfect, the resulting beam comprising darker areas, corresponding to the interstitial areas of the light source. In the second case, the individual character of the emissive elements is far less perceptible, the parameter δ having been doubled relative to the previous case (40 μm instead of 20 μm).

The invention is not limited to the embodiments described above.

What is claimed is:

1. An optical device for projecting light beams, able to interact with a pixelated light source with a plurality of selectively activatable emissive elements, the device comprising a lens with a first face, the first face includes an array of recessed patterns, wherein each pattern is such that:
   each pattern exhibits rotational symmetry about a local normal direction to the first face so as to define, in any plane containing the local normal direction, a symmetrical profile with two areas including a first area and a second area, about the local normal;
   each of the two areas comprises two portions, a basal portion of the first area having a bottom joining point with a basal portion of the second area, the basal portion of the first area comprising a first intermediate joining point with a top portion of the first area, and the basal portion of the second area comprising a second intermediate joining point with a top portion of the second area;
   for each of the two areas, the basal portion and the top portion are symmetrical about their respective intermediate joining point.

2. The device as claimed in claim 1, wherein the symmetrical profile has, at the bottom joining point, a tangent orthogonal to the local normal direction and an infinite second derivative.

3. The device as claimed in claim 1, wherein the symmetrical profile is defined by the following formula of the basal portion of the first area:

$$F(y) = \frac{2}{3(n-1)}\sqrt{\frac{k}{\pi}}\,y^{\frac{3}{2}}$$

where:
- F(y) is a coordinate of a function point of the basal portion of the first area, along the local normal direction using the bottom joining point with the basal portion of the second area as the origin of the coordinates along the local normal direction, the function point having y as coordinate along a local direction perpendicular to the local normal direction;
- n is the refractive index of the material of the lens;
- k is a constant.

4. The device as claimed in claim 1, wherein the first face is the exit face of the lens.

5. The device as claimed in claim 1, wherein the first face is carried by a plane.

6. The device as claimed in claim 1, wherein the first face is carried by a portion of a sphere.

7. The device as claimed in claim 1, wherein a maximum deflection angle of light rays at an output from the first face is less than or equal to the width of an emissive element of the plurality of emissive elements.

8. The device as claimed in claim 1, wherein the patterns have a depth dimension less than 2 μm.

9. The device as claimed in claim 1, wherein the patterns have a diameter less than 1.5 mm at the first face.

10. The device as claimed in claim 1, wherein the lens is a projection lens.

11. A lighting module for a motor vehicle, comprising:
- an optical device including a lens with a first face, the first face includes an array of recessed patterns, wherein each pattern is such that:
  - each pattern exhibits rotational symmetry about a local normal direction to the first face so as to define, in any plane containing the local normal direction, a symmetrical profile with two areas, specifically a first area and a second area, about the local normal;
  - each of the two areas comprises two portions, a basal portion of the first area having a bottom joining point with a basal portion of the second area, the basal portion of the first area comprising a first intermediate joining point with a top portion of the first area, and the basal portion of the second area comprising a second intermediate joining point with a top portion of the second area;
  - for each of the two areas, the basal portion and the top portion are symmetrical about their respective intermediate joining point; and
- a pixelated light source including a plurality of selectively activatable emissive elements.

* * * * *